United States Patent [19]

Neville

[11] Patent Number: 4,701,348

[45] Date of Patent: Oct. 20, 1987

[54] METHOD OF COATING THE THREADS OF A FASTENER

[75] Inventor: Glen F. Neville, Howell, Mich.

[73] Assignee: Glenco Manufacturing, Inc., Brighton, Mich.

[21] Appl. No.: 933,006

[22] Filed: Nov. 20, 1986

[51] Int. Cl.[4] .............................................. B05D 3/12
[52] U.S. Cl. ...................................... 427/57; 427/55; 427/314; 427/385.5
[58] Field of Search ................. 427/57, 55, 314, 385.5

Primary Examiner—Bernard D. Pianalto
Attorney, Agent, or Firm—Cullen, Sloman, Cantor, Grauer, Scott & Rutherford

[57] ABSTRACT

A method of applying a coating, such as a fluorocarbon barrier coating, to the threads of a fastener, particularly suitable for applying a coating to a female fastener having a threaded bore. The method includes forming a fluid suspension of the coating material, such as an unpolymerized fluorocarbon in an organic solvent, forming a drop of the coating material fluid suspension on the tip of an ultrasonic transducer and bringing the tip into proximity with the fastener threads, which are preferably preheated. The ultrasonic tip is then vibrated in the ultrasonic range, exploding the drop and coating the fastener threads with a fine mist of the fluid suspension. The fastener is then heated to vaporize the solvent and polymerize the coating material where the coating material is polymerizable. When coating female fasteners, the tip of the ultrasonic transducer is preferably lowered within the thread cylinder, adjacent the top thread.

12 Claims, 5 Drawing Figures

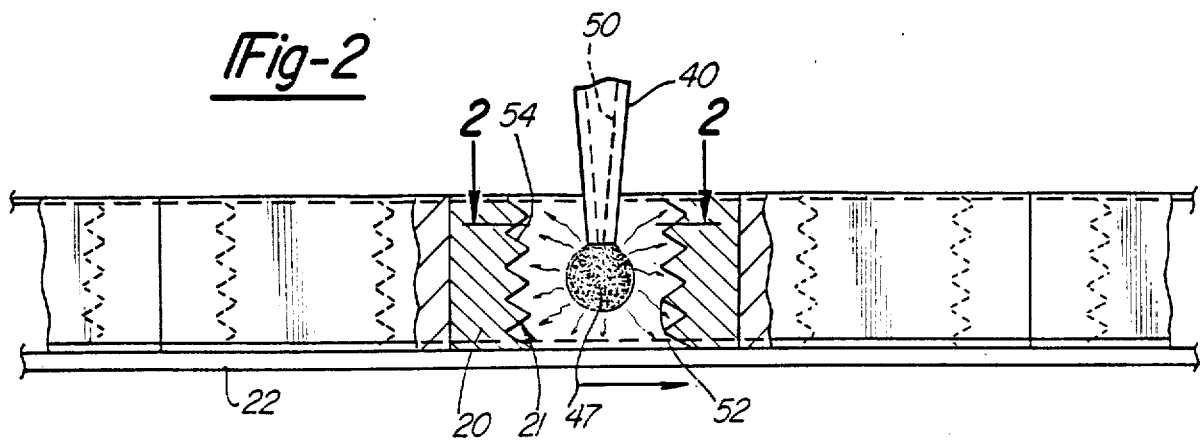
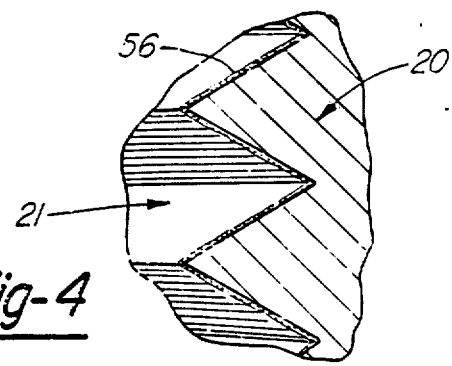
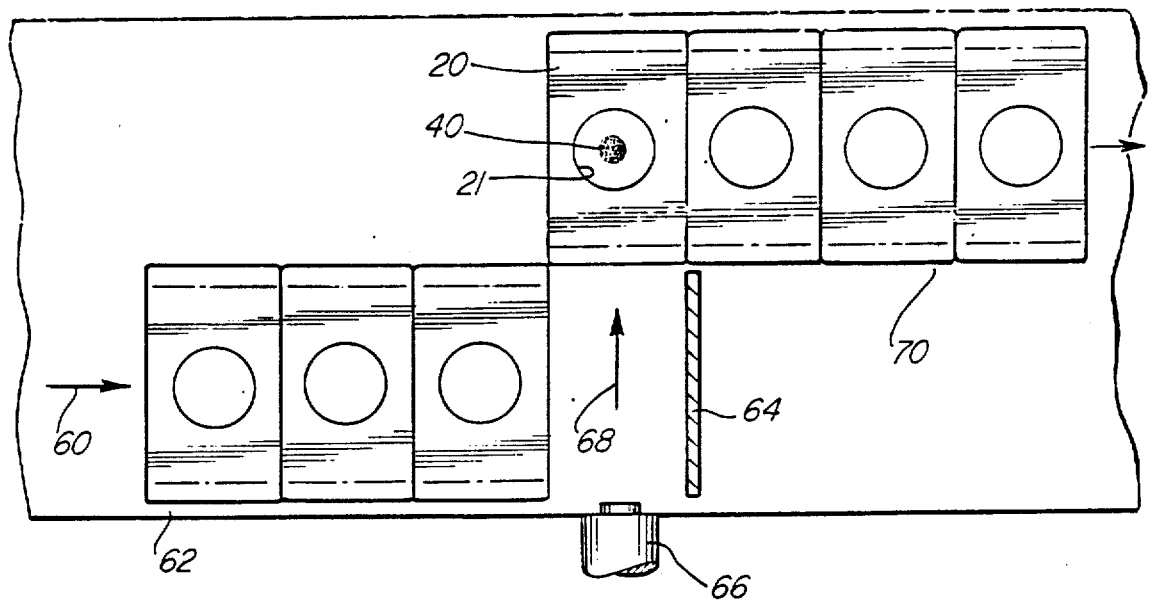

METHOD OF COATING THE THREADS OF A FASTENER

BACKGROUND OF THE INVENTION

A method of applying coatings to threaded elements, which is particularly useful for applying fluorocarbon coatings to female threads. The method includes exploding a drop of the coating material in a solvent suspension onto the threads with an ultrasonic atomizer.

Male threaded elements, including bolts, have been coated with various coatings, including Teflon, for some time by spraying a fluid suspension of the coating material in an organic solvent on the threads or dipping the threaded portion into the coating material and then heating the threads to vaporize the solvent and cure the coating when a polymerized coating is to be formed. The waste of coating material can be reduced by spraying the threads over the source of the coating material and allowing the excess fluid suspension to drip or run off into the source. This step, of course, slows down the process and may uncover the crests of the threads. Further, conventional pressurized spraying techniques impact the sprayed area at relatively high speeds, resulting in "bounce-back", which may result in a non-uniform coating, with a thin coating on the crest of the threads and a thicker coating in the root portion. Finally, fluorinated hydrocarbons are expensive and any waste results in increased manufacturing costs.

More recently, certain automotive manufacturers have required barrier coatings of a polymerized fluorinated hydrocarbon on fasteners which are later processed through electrode deposited primers and paint. Pierce nuts and weld nuts, for example, are permanently attached to basic vehicle structural components prior to painting for interconnecting other various assembly components, including body panels. The exposed threads may become contaminated, making it more difficult to thread a bolt into the nut fastener.

Two alternative methods have been proposed for coating the threads of nut-type fasteners, including pierce nuts and weld nuts. In the first method, the coating material, which is a fluorinated hydrocarbaon such as Teflon, is suspended in an organic solvent and the suspension is sprayed on the nut threads, using a small high pressure nozzle. The fasteners are then heated to a temperature of about 450° F. for 20 minutes, vaporizing the organic solvent and curing the fluorocarbon. This method has several disadvantages. First, as described above, spray coatings are uneven, with a greater accumulation of the coating in the root of the thread because the pressurized spray bounces off the crest of the threads. Second, because the fluid suspension must be relatively "dilute" to avoid clogging of the spray nozzle, the coating quickly runs off, prior to curing. Third, as described, a substantial portion of the expensive polycarbon is wasted, resulting in substantially increased material costs.

The second method includes applying the fluorocarbon in a "solid" or thick paste. This method has similar disadvantages. First, it is difficult to apply an even consistent coating to the threads. Second, the coating material is very expensive and difficult to apply, resulting in waste and increased material cost. Finally, the coating is uneven, because it is difficult to uniformly coat the root and crest of the threads.

The method of this invention eliminates many of the problems with the prior art by applying the coating with an ultrasonic atomizer which allows the use of less solvent, reduces run-off and eliminates bounce-back because the atomized coating material impacts the threads at a relatively low velocity. Finally, very little material is wasted, as described hereinbelow.

SUMMARY OF THE INVENTION

The method of coating the threads of a fastener of this invention includes first forming a fluid suspension of the coating material, preferably in the form of a fine powder in a fluid suspension. The method of this invention is suitable for coating the threads with a polymerized fluorinated hydrocarbon and, as described above, the fluid suspension may be relatively dense because it is not sprayed through a nozzle. The threads of the fastener to be coated are preferably heated prior to coating to further reduce run-off. A drop of the coated material fluid suspension is then formed on the tip of an ultrasonic transducer head and the tip is brought into proximity with the heated fastener threads. The transducer head is then vibrated in the ultrasonic range, exploding the drop and coating the threads with a fine mist of the coating material fluid suspension. Finally, the fastener is heated to vaporize the solvent, forming a dry coating on the threads. Where the coating material is a fluorinated hydrocarbon, the fasteners are heated, following coating, to the curing temperature of the fluorocarbon, forming a dry coating of polymerized fluorocarbon on the threads.

As described, the method of this invention has several important advantages over the prior art. First, a very small metered amount of coating material is used, substantially reducing waste. Second, the "spray" velocity is very low, substantially eliminating bounce back and evenly coating the threads, including the root and crest portions. Further, the method of this invention is very energy efficient, utilizing about 1/10th the electrical energy of a conventional spray nozzle. Finally, because the coating material may be relatively dense, as compared to pressurized spray methods, run-off is substantially reduced, improving the uniformity and consistency of the coating and further reducing material cost.

In the method of applying a coating to the threads of a female fastener, such as a pierce or weld nut, the method preferably includes forming a drop of the coating material fluid suspension on the tip of an ultrasonic head having a diameter which is substantially less than the internal diameter of the female threaded bore, then locating the ultrasonic tip within the female threaded bore and vibrating the head to explode the drop in a fine mist to coat the threads, as described above. In the most preferred method, the drop of coating material fluid suspension is formed on the tip while the tip is vibrating at a lower frequency and then rapidly increasing the frequency in the ultrasonic range to coat the threads, as described. This improves the efficiency of the method. As described, the method of this invention is suitable for coating the threads of a fastener with a polymerized fluorocarbon, wherein the preferred carrier is a vaporizable fluid solvent including methyl ethyl keytone.

Other advantages of the method of coating the threads of a fastener of this invention will be more fully understood from the following description of the preferred embodiments, the appended claims and the drawings, a brief description of which follows.

BRIEF DESCRIPTION OF THE DRAWINGS

FIG. 2 is a side partially cross-sectioned view of the coating method;

FIG. 3 is a top cross-sectional view of FIG. 2, in the direction of view arrows 3—3;

FIG. 4 is a side cross-sectional view of a thread following coating; and

FIG. 5 is a top view similar to FIG. 2.

DESCRIPTION OF THE PREFERRED EMBODIMENTS

Figure 1:
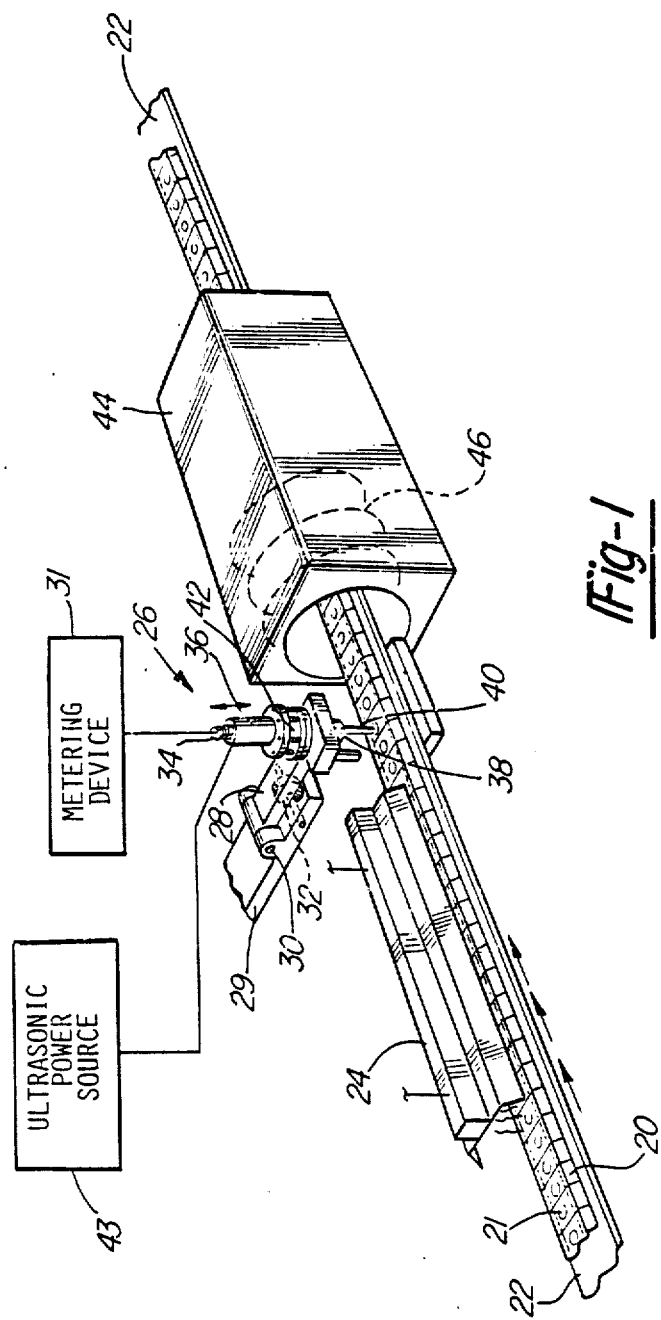
FIG. 1 is a side elevation including schematic representations of the method of this invention.

FIG. 1 illustrates, somewhat schematically, a preferred embodiment of the method of this invention. The nuts 20 are received on a track 22 from a hopper or other source of nuts, not shown. Each nut includes a threaded bore 21 which is to be coated by the method of this invention. The illustrated nuts are pierce nuts manufactured by Multifastener corporation and its licensees. The pierce nuts are transferred beneath radiant heater 24 and heated to a temperature of about 150° F. The preferred temperature will be dependent upon the material used to coat the nuts. The disclosed embodiment of the method is coating the nuts with a fluorinated hydrocarbon or fluorocarbon such as a fluorinated ethylene-propylene co-polymer available from E.I. DuPont DeNemours under the brand name "Teflon-S". The fluorocarbon is supplied as a fluid suspension of the fluorocarbon is in the form of a fine powder of the unpolymerized fluorocarbon in a fluid solvent. The most preferred solvent for a fluorinated hydrocarbon includes methyl ethyl ketone (MEK) and generally includes alcohol. As will be understood, however, the method of this invention may also be utilized to coat the threads of the fastener with other coatings, including molybdenum disulfide, which is utilized to control torque in a bolt and nut assembly, graphite and other materials. Further, as described above, the method of this invention may be utilized to coat other types of fasteners, including male threaded elements, however, the method of this invention is particularly adapted to the very difficult task of coating the threads of a female fastener element, such as pierce nuts and weld nuts.

The nuts 20 are received from the radiant heater 24 beneath the ultrasonic atomizer 26 wherein the coating material is applied to the nuts as described more fully hereinbelow. The ultrasonic atomizer 26 is supported on a pivot arm 28 which is connected to the main support 29 by a pivot pin 30, such that the pivot arm 28 may be raised about pivot axis 30 out of the path of the nuts or lowered into the nut bores to coat the nuts, as described. The pivot arm 28 is raised or lowered by cam 32. The ultrasonic atomizer 26 includes an inlet tube 34 which receives metered volumes of the coating materials from a metering device 31. The ultrasonic atomizer further includes a reflecting horn 36, an atomizing horn 38 having a preferably integral atomizing horn tip 40 and a piezoelectric crystal transducer and seal assembly 42. As described more fully hereinbelow, the piezoelectric transducer 42 vibrates at a controlled frequency, which is controlled by the ultrasonic power source 43, which vibrates the atomizing horn 38 and tip 40 to explode a drop formed on the end of the tip 40, atomizing the drop and coating the threads of the fastener. The ultrasonic atomizer 26 is then raised by the pivot arm 28 and the next nut is received beneath the atomizing horn tip 40 to coat the next adjacent nut. As will be understood, the apparatus may include several in-line ultrasonic atomizers to increase the speed of the operation.

The coated nuts are then received in a second heater 44, which is preferably an electrical conduction heater having a spiral conductor 46. Again, the preferred temperature induced by the conduction heater 44 will depend upon the coating applied to the nut threads. Where the threads are coated with a fluorocarbon, a suitable temperature is about 450° F., wherein the nuts are heated for several minutes. This heat vaporizes the organic solvent and cures or polymerizes the fluorocarbon on the threads, forming a uniform coating. The coated and cured nuts then continue on the track 22 to a storage station, such as a conventional hopper, for installation to a panel as described in several prior art patents assigned to Multifastener Corporation.

The method of coating the nuts is illustrated more graphically in FIGS. 2 and 3. As described, the nuts 20 each include a threaded bore 21. In FIG. 2, the atomizing horn tip 40 has been lowered into the nut bore and a drop of coating material 47 has been metered through the fluid passage 50 in the tip to collect at the free end of the tip in a drop 47. Power is then supplied to the piezoelectric crystal transducer 42 (FIG. 1) which causes the tip to vibrate within the ultrasonic range, which is greater than about 20 kilohertz (kHz). The vibration forms a two dimensional grid of capillary waves in the surface film of the drop. Increasing the frequency of the vibrations shortens the distance between the wave crest and, as the amplitude increases, the height of the waves increases until the critical amplitude is reached and the drop literally explodes and atomizes into a fine mist. The preferred diameter of the drop and frequency of the vibration will depend upon the coating material, however, a drop having a diameter of about 25 μm will atomize at about 60 kHz. Further, it has been found that it is preferable in the method of this invention to maintain a lower vibration frequency in the tip as the drop collects on the tip, reducing the time necessary to reach the critical amplitude and improving the efficiency of the system and method of this invention. Thus, the preferred method of this invention includes maintaining power to the piezoelectric crystal transducer 42 and vibrating the atomizing horn tip 40 at a lower frequency, about 10 kHz or less than about 25 kHz, then increasing the frequency to the atomizing frequency when the drop is fully formed and located within the nut bore.

It is important to understand that the method of this invention is materially different from the conventional method of spraying the threads with a conventional pressurized spray nozzle. Typical nozzles have a mean droplet velocity of 10 to 20 meters per second, as compared to the low velocity "spray" generated by ultrasonic atomization, which has a velocity of only about 0.3 meters per second. Ultrasonic atomization therefore eliminates "bounce-back", wherein the spray would otherwise bounce off of the crest 52 of the thread and accumulate primarily in the root 54. The "soft spray" generated by the atomizing tip evenly coats the root and crest, resulting in a uniform coating 56 on the threads, as shown in FIG. 4. The preferred coating may have a thickness between about 0.0005 and 0.002 inches depending upon the size of the drop 47 and the thickness may be accurately controlled. Further, the coating material may be considerably more dense than material atomized through a conventional pressurized spray nozzle, limiting run-off and further accumulation of the coating material in the root of the thread. In a typical application, the coating material may be about 75% by volume "Teflon-S" and 25% by volume MEK. The viscosity of this material is 16 seconds in a No. 2 cup. Further, the volume of coating material utilized is very low, limited to the size of the drop on the atomizing transducer tip 40, which may be accurately controlled by the metering device, substantially eliminating waste and lowering material costs.

As will be understood, the atomizing horn tip 40 should be accurately located in the nut thread, prior to atomization, and FIG. 5 illustrates a suitable apparatus for accurately locating the atomizing tip 40 within the thread cylinder 21 of a nut 20. The nuts are received in a first channel 62 in the direction of arrow 60 to engage a stop 64. A pusher rod 66 then transfers the nut which engages the stop 64 accurately beneath the atomizing horn tip 40 in the direction of arrow 68. The atomizing tip 40 is then lowered into the nut bore 21 and the thread is coated, as described above. The nuts are then transferred through second channel 70 into the conduction heater, as described above. This transfer assures accurate location of the nuts beneath the transducer tip and therefore a uniform coating of the nut threads.

The details of the liquid metering device 31, ultrasonic atomizer 26 and power source 43 have not been disclosed herein because such components can be purchased commercially. For example, a suitable liquid metering device is available from EFD, Inc. in East Providence, R.I. A suitable ultrasonic atomizer of the type disclosed herein is available from Sono-Tek Corporation located in Poughkeepsie, N.Y., which also has a suitable power source. As described above, the method of this invention may be utilized to coat the threads of any type of threaded element, including male and female fasteners, however, the method of this invention is particularly adapted to coating female fasteners because of the difficulties associated with coating the threads of a nut-type fastener. Further, various modifications may be made to the application apparatus disclosed herein without departing from the purview of the appended claims. For example, the fasteners may be received and oriented on a turntable, wherein the turntable is stopped to locate a nut fastener beneath the ultrasonic transducer tip, which is then lowered within the nut bore, as described above. Finally, the fasteners may be heated by any suitable means including, but not limited to the radiant and induction heaters disclosed herein.

I claim:

1. A method of coating the threads of a fastener, comprising the following steps:
   (a) forming a fluid suspension of said coating material in the form of a fine powder in a fluid solvent;
   (b) heating said fastener threads;
   (c) forming a drop of said coating material fluid suspension on the tip of an ultrasonic head and bringing said head into proximity with said heated fastener threads;
   (d) vibrating said head in the ultrasonic range, exploding said drop and coating said threads with a fine mist of said coating material fluid suspension; and
   (e) further heating said fastener threads to vaporize said solvent, forming a dry coating on said threads.

2. The method of applying a coating to the threads of a fastener defined in claim 1, wherein said coating is a polymerized fluorinated hydrocarbon, said method including forming a fluid suspension of unpolymerized fluorinated hydrocarbon in the form of a fine powder in a fluid solvent including methyl ethyl keytone and said method further including heating said fastener threads following ultrasonic coating to above the polymerization temperature of said fluorinated hydrocarbon, vaporizing said solvent and forming a dry coating of polymerized fluorinated hydrocarbon on said threads.

3. The method of applying a coating to the threads of a fastener as defined in claim 1, characterized in that said fastener includes a threaded bore, said method including forming a drop of said coated material fluid suspension on the tip of an ultrasonic head, said tip having a diameter which is substantially less than the internal diameter of said female threaded bore, locating said ultrasonic head tip within said female threaded bore, vibrating said head in the ultrasonic range exploding said drop and coating said female threads with a fine mist of said coating material fluid suspension, and further heating said fastener threads to vaporize said solvent and form a dry coating on said threads.

4. The method of applying a coating to the threads of a female fastener as defined in claim 3, including vibrating said ultrasonic head tip at a relatively low frequency as said drop of coating material fluid suspension is formed on said tip, then rapidly increasing the frequency of vibration in the ultrasonic range, exploding said drop and coating said threads as defined.

5. A method of applying a coating to the threads of a female fastener having a threaded bore, comprising the following steps:
   (a) forming a fluid suspension of said coating material in the form of a powder in a vaporizable fluid solvent;
   (b) heating said fastener, including said threaded female fastener bore;
   (c) forming a drop of said coating material fluid suspension on the tip of an ultrasonic head, said tip having a diameter which is substantially less than the internal diameter of said threaded female fastener bore;
   (d) locating the end of said ultrasonic head tip and drop within said threaded female fastener bore and vibrating said ultrasonic head tip in the ultrasonic range, exploding said drop and coating said threads with a fine mist of said coating material fluid suspension; and
   (e) further heating said fastener to vaporize said solvent, forming a dry coating on said threaded female fastener bore.

6. The method of applying a coating to a threaded female fastener bore as defined in claim 1, wherein said ultrasonic head tip is normally located above said threaded fasteners, said method including lowering said tip into said female fastener bore adjacent the upper surface of said fastener and vibrating said ultrasonic head tip in the ultrasonic range, exploding said drop and coating said threads with a fine mist of said coating material as defined.

7. The method of applying a coating to a threaded female fastener bore as defined in claim 6, wherein said coating is a polymerized fluorinated hydrocarbon, said method including forming a fluid suspension of unpolymerized fluorinated hydrocarbon in the form of a fine powder in a fluid solvent including methyl ethyl keytone and said method further including heating the coated threads to the polymerization temperature of said fluorinated hydrocarbon, vaporizing said solvent and forming a coating of said polymerized fluorinated hydrocarbon on said threaded female fastener bore.

8. The method of applying a coating to a threaded female fastener bore as defined in claim 7, wherein said method includes continuing to vibrate said ultrasonic head tip at a relatively lower frequency while forming said drop of said fluorinated hydrocarbon fluid suspension on said tip, then rapidly increasing the frequency of said vibration in the ultrasonic range, exploding said drop and coating said threads with a fine mist of said unpolymerized fluorinated hydrocarbon suspension and further heating said fastener as defined.

9. A method of coating the threads only of a plurality of female fasteners with a relatively thin coating of a solid coating material, each fastener having a threaded bore and said method comprising the following steps:
 (a) forming a suspension of said coating material in the form of a relatively fine powder suspended in a vaporizable fluid solvent;
 (b) moving said fasteners individually below the tip of an ultrasonic transducer and forming a drop of said coating material suspension on the end of said ultrasonic transducer tip, and tip having a diameter which is substantially less than the internal diameter of said female fastener threaded bores; bores;
 (c) lowering said ultrasonic transducer tip into one of said threaded female fastener bores and vibrating said tip in the ultrasonic range, exploding said drop and coating said threaded female fastener bore with a fine mist of said coating material fluid suspension; and
 (d) raising said transducer tip and further heating said fasteners to vaporize said solvent forming a dry coating on said threaded bore.

10. The method of coating the threads of a plurality of female fasteners as defined in claim 9, wherein said coating is a polymerized fluorocarbon, said method including forming a fluid suspension of unpolymerized fluorocarbon in the form of a fine powder is a vaporizable fluid solvent including methyl ethyl keytone, said method further including heating said fasteners to above the polymerization temperature of said fluorocarbon, vaporizing said solvent and forming a dry coating of polymerized fluorocarbon on said female fastener threaded bores.

11. The method of coating the threads of a plurality of female fasteners as defined in claim 9, wherein said female fasteners are received in a linear track, said method including moving said fasteners in said track, preheating said fasteners with a radiant heater while located in said track, then accurately locating a fastener with said transducer tip coaxially aligned with said fastener threaded bore, then lowering said ultrasonic transducer tip into said coaxially aligned threaded bore and coating said threaded bore with a fine mist of said coating material fluid suspension, as defined.

12. The method of coating the threads of a plurality of female fasteners as defined in claim 9, wherein said method includes vibrating said ultrasonic transducer tip while forming said drop of coating material suspension on the end of said ultrasonic transducer tip, then rapidly increasing the frequency of vibration of said transducer tip in the ultrasonic range, exploding said drop and coating said threaded female fastener bore with a fine mist of said coating materil fluid suspension as defined.

* * * * *

UNITED STATES PATENT AND TRADEMARK OFFICE
CERTIFICATE OF CORRECTION

PATENT NO. : 4,701,348
DATED : October 20, 1987
INVENTOR(S) : Glen F. Neville

It is certified that error appears in the above-identified patent and that said Letters Patent is hereby corrected as shown below:

In claim 9, line 11, delete "and" and insert therefor —said—.

In claim 9, line 13, delete "bores;", second occurrence.

Signed and Sealed this

Fourteenth Day of June, 1988

Attest:

DONALD J. QUIGG

*Attesting Officer*    *Commissioner of Patents and Trademarks*